(12) United States Patent
Becker

(10) Patent No.: US 12,151,526 B2
(45) Date of Patent: Nov. 26, 2024

(54) SPRING SEAT, METHOD FOR PRODUCING A SPRING SEAT, VIBRATION DAMPER AND LEVEL ADJUSTMENT DEVICE

(71) Applicants: ThyssenKrupp Bilstein GmbH, Ennepetal (DE); thyssenkrupp AG, Essen (DE)

(72) Inventor: Matthias Becker, Froendenberg (DE)

(73) Assignees: thyssenkrupp Bilstein GmbH, Ennepetal (DE); thyssenkrupp AG, Essen (DE)

( * ) Notice: Subject to any disclaimer, the term of this patent is extended or adjusted under 35 U.S.C. 154(b) by 322 days.

(21) Appl. No.: 17/780,856

(22) PCT Filed: Nov. 12, 2020

(86) PCT No.: PCT/EP2020/081817
§ 371 (c)(1),
(2) Date: May 27, 2022

(87) PCT Pub. No.: WO2021/104882
PCT Pub. Date: Jun. 3, 2021

(65) Prior Publication Data
US 2023/0010080 A1 Jan. 12, 2023

(30) Foreign Application Priority Data
Nov. 28, 2019 (DE) ...................... 10 2019 218 494.4

(51) Int. Cl.
*B60G 15/06* (2006.01)
*B60G 11/16* (2006.01)
(Continued)

(52) U.S. Cl.
CPC ............ *B60G 15/063* (2013.01); *B60G 11/16* (2013.01); *F16F 1/121* (2013.01); *F16F 9/56* (2013.01)

(58) Field of Classification Search
CPC .................. B60G 15/063; B60G 11/16; B60G 2204/1242; F16F 9/56; F16F 1/121
See application file for complete search history.

(56) References Cited

U.S. PATENT DOCUMENTS 3,043,581 A * 7/1962 Schmidt ............... B60G 15/063
267/221
3,951,391 A * 4/1976 Papousek ............. B60G 13/001
267/218

(Continued)

FOREIGN PATENT DOCUMENTS

| CN | 103764417 A | 4/2014 |
| CN | 104482099 A | 4/2015 |

(Continued)

OTHER PUBLICATIONS

English Translation of International Search Report issued in PCT/EP2020/081817, dated Feb. 3, 2021.

*Primary Examiner* — Bradley T King
*Assistant Examiner* — James K Hsiao
(74) *Attorney, Agent, or Firm* — hyssenkrupp North America, LLC

(57) ABSTRACT

A spring seat, in particular a spring plate for a vibration damper, in particular a vehicle vibration damper, in particular a spring plate for a level adjustment device, in particular a vehicle height adjustment device, may include a spring retaining ring with an internal cross section or an internal cross-sectional area. The spring seat may also include a spring element configured to reduce the internal cross section of the spring retaining ring. The spring element may be configured such that a reduction of the internal cross section is configured to occur in a radial direction. The spring element may further include a tensioning element configured to adjust a spring tension of the spring element.

11 Claims, 4 Drawing Sheets

(51) Int. Cl.
*F16F 1/12* (2006.01)
*F16F 9/56* (2006.01)

(56) References Cited

U.S. PATENT DOCUMENTS

| | | | | |
|---|---|---|---|---|
| 4,183,509 | A * | 1/1980 | Nishikawa | B60G 15/063 |
| | | | | 267/218 |
| 4,428,565 | A * | 1/1984 | Stiefel | F16F 13/02 |
| | | | | 188/322.22 |
| 4,683,993 | A | 8/1987 | Tanabe et al. | |
| 5,240,269 | A * | 8/1993 | Kerr | B60G 3/14 |
| | | | | 267/141.1 |
| 5,553,713 | A | 9/1996 | Sydekum et al. | |
| 5,722,645 | A | 3/1998 | Reitter | |
| 6,217,012 | B1 * | 4/2001 | Hashirayama | B60G 15/063 |
| | | | | 267/221 |
| 7,117,982 | B2 * | 10/2006 | Kojima | F16F 13/007 |
| | | | | 188/322.19 |
| 7,617,792 | B1 * | 11/2009 | Pursley | E02B 3/26 |
| | | | | 405/211 |
| 7,988,166 | B2 * | 8/2011 | Heeren | B60G 13/006 |
| | | | | 280/124.1 |
| 8,733,744 | B2 * | 5/2014 | Kerr | F16F 9/3271 |
| | | | | 267/140 |
| 9,869,360 | B2 * | 1/2018 | Smith | F16B 37/0892 |
| 10,512,334 | B1 * | 12/2019 | Koh | A47C 3/30 |
| 10,570,976 | B1 * | 2/2020 | Evans | F16F 1/13 |
| 2003/0098448 | A1 * | 5/2003 | Horst | B60G 17/021 |
| | | | | 254/10.5 |
| 2007/0045066 | A1 * | 3/2007 | Sadanowicz | B60B 27/00 |
| | | | | 188/218 XL |
| 2010/0252972 | A1 * | 10/2010 | Cox | F16F 1/121 |
| | | | | 267/286 |
| 2010/0308518 | A1 * | 12/2010 | Michel | F16F 1/121 |
| | | | | 267/225 |
| 2011/0298168 | A1 * | 12/2011 | Groebner | F16F 1/121 |
| | | | | 267/217 |
| 2014/0096664 | A1 * | 4/2014 | Nakata | F16F 1/121 |
| | | | | 248/578 |
| 2014/0230222 | A1 * | 8/2014 | Mizukoshi | F16F 1/122 |
| | | | | 267/179 |
| 2015/0158362 | A1 | 6/2015 | Palka et al. | |
| 2016/0001623 | A1 | 1/2016 | Cox et al. | |
| 2017/0028804 | A1 | 2/2017 | Lindemann et al. | |
| 2017/0225533 | A1 * | 8/2017 | Wegele | B60G 17/005 |
| 2017/0313151 | A1 | 11/2017 | Reimann et al. | |
| 2018/0304957 | A1 * | 10/2018 | Kobayashi | B62K 25/286 |
| 2019/0308483 | A1 * | 10/2019 | Cox | B60G 17/021 |
| 2023/0010080 | A1 | 1/2023 | Becker | |
| 2024/0059116 | A1 * | 2/2024 | Matsubara | B60G 15/02 |

FOREIGN PATENT DOCUMENTS

| | | |
|---|---|---|
| CN | 107074056 A | 8/2017 |
| CN | 208852237 U | 5/2019 |
| CN | 209055238 U | 7/2019 |
| CN | 209203359 U | 8/2019 |
| DE | 199 51 728 A1 | 5/2000 |
| DE | 10 2011 109 275 A1 | 2/2013 |
| GB | 699809 A | 11/1953 |
| GB | 2 467 553 A | 8/2010 |
| JP | H06-87744 U | 12/1994 |
| JP | H07-280018 A | 10/1995 |
| JP | H08-219221 A | 8/1996 |
| JP | 2002-242980 A | 8/2002 |
| JP | 2005-273733 A | 10/2005 |
| JP | 2006-160223 A | 6/2006 |
| WO | 2019/238959 A1 | 12/2019 |

* cited by examiner

SPRING SEAT, METHOD FOR PRODUCING A SPRING SEAT, VIBRATION DAMPER AND LEVEL ADJUSTMENT DEVICE

CROSS REFERENCE TO RELATED APPLICATIONS

This application is a U.S. National Stage Entry of International Patent Application Serial Number PCT/EP2020/081817, filed Nov. 12, 2020, which claims priority to German Patent Application No. DE 10 2019 218 494.4, filed Nov. 28, 2019, the entire contents of which are incorporated herein by reference.

FIELD

The present disclosure generally relates to vibration dampers, including spring seats, methods for producing spring seats, and level adjustment devices.

BACKGROUND

Spring seats, in particular spring plates for a vibration damper for receiving helical (compression) springs are known in the prior art in a large number of embodiments. A spring seat is usually a constituent part of a suspension strut and/or a level adjustment device, it being the main function of the spring seat to fix the helical (compression) springs, in particular chassis springs, and to keep them under tension. Thus, the chassis springs are able to convert shocks caused by an uneven roadway into vibratory movements.

The problem is to provide spring seats which are secure against rotation and, at the same time, can be assembled in a space-saving, simple, time-saving manner and can be produced cost-effectively and which, in addition, meet or exceed the safety, operating and durability requirements and strength requirements.

Thus a need exists for an improved spring seat, an improved vibration damper and an improved level adjustment device in which the aforementioned disadvantages are avoided. In particular, with this improved spring seat, the improved vibration damper and the improved level adjustment device, a need exists to enable a space-saving and simple, in particular conveniently and easily mounted and cost-effective design. In addition, with this improved spring seat, the improved vibration damper and the improved level adjustment device, simple mounting, displaceability and adjustability are needed, even with dirty components.

DETAILED DESCRIPTION

Figure 1:
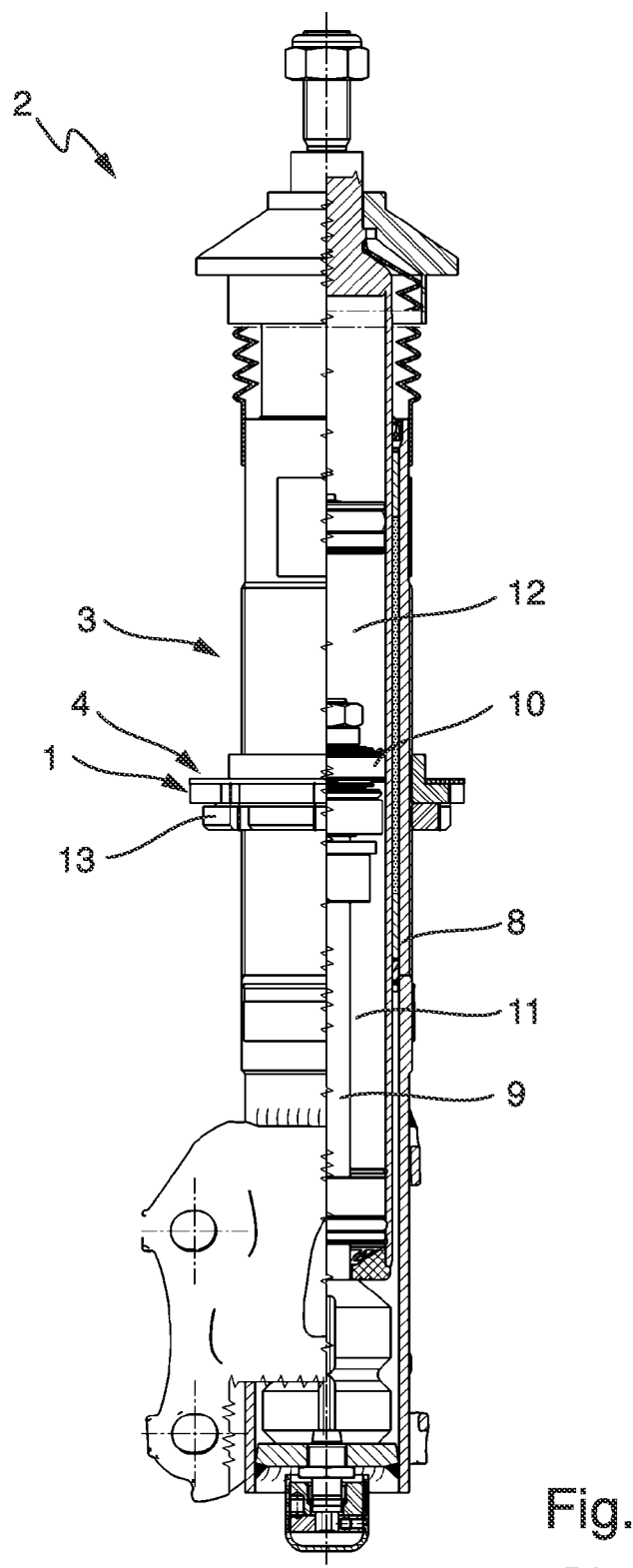
FIG. 1 is a schematic external view of a prior art vibration damper having a spring seat.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The spring seat according to the invention, as compared with conventional spring seats, has the advantage that the antirotation safeguard is designed in a space-saving manner and, in particular, no further component such as a locking nut and/or a grub screw, for example, is required.

The vibration damper according to the invention, as compared with conventional vibration dampers, has the advantage that the fixing of the spring seat saves space and neither a locking ring nor a grub screw is required. Furthermore, the spring seat according to the invention can be secured against rotation on the vibration damper according to the invention without any thread damage. In addition, the spring seat according to the invention can be arranged on the vibration damper according to the invention with a high clamping force. Furthermore, mounting, displaceability and adjustability is simply and easily possible, even with dirty components. In addition, by means of the spring seat according to the invention, improved dirt removal is made possible, in particular via a material cutout.

The level adjustment device according to the invention, as compared with conventional level adjustment devices, has the advantage that the fixing of the spring seat saves space and neither a locking ring nor a grub screw is required. Furthermore, the spring seat according to the invention can be secured against rotation on the level adjustment device according to the invention without any thread damage. In addition, the spring seat according to the invention can be arranged on the level adjustment device according to the invention with a high clamping force. Furthermore, mounting, displaceability and adjustability is simply and easily possible, even with dirty components. In addition, by means of the spring seat according to the invention, improved dirt removal is made possible, in particular via a material cutout.

The subject of the invention is, therefore, a spring seat, in particular a spring plate for a vibration damper, in particular a vehicle vibration damper, in particular a spring plate for a level adjustment device, in particular a vehicle height adjustment device, comprising a spring retaining ring with an internal cross section, in particular an internal cross-sectional area, wherein the spring seat has at least one spring element for reducing the internal cross section of the spring retaining ring.

A further subject of the invention is a method for producing a spring seat, in particular a spring plate for a vibration damper, in particular a vehicle vibration damper, comprising the steps:

a) providing a spring seat, in particular a spring plate for a vibration damper, in particular a vehicle vibration damper, comprising a spring retaining ring with an internal cross section, in particular an internal cross-sectional area, and b) forming at least one spring element on a spring seat provided in step a) in such a way that an adjustment of the reduction in the internal cross section of the spring retaining ring is carried out by using the spring element.

A further subject of the invention is a vibration damper for vehicles, comprising a damper tube at least partly filled with damping liquid, wherein a spring seat, in particular a spring plate, is arranged coaxially around the damper, wherein a piston rod is movable to and fro in the damper tube, wherein an operating piston is moved along with the piston rod, by means of which the internal space of the damper tube is divided into an operating chamber on the piston rod side and an operating chamber remote from the piston rod, wherein the spring seat has at least one spring element, wherein the spring seat forms a force-fitting connection, in particular a clamping connection, in relation to the damper tube by means of the at least one spring element.

A further subject of the invention is a level adjustment device, in particular a lifting element for level adjustment, in particular vehicle height adjustment, wherein the level adjustment device has a spring seat, in particular a spring plate comprising a spring retaining ring (4) with an internal cross section, in particular an internal cross-sectional area, wherein the spring seat has at least one spring element for reducing the internal cross section of the spring retaining ring.

A further subject of the invention is the use of a spring seat, in particular a spring plate for producing a vibration damper, in particular a vehicle vibration damper and/or for producing a level adjustment device, in particular a lifting element for level adjustment, in particular vehicle height adjustment.

The invention can be implemented both in a spring seat, a method for producing a spring seat, a vibration damper and a level adjustment device.

The invention comprises the following embodiments:

1. A spring seat, in particular a spring plate for a vibration damper, in particular a vehicle vibration damper, in particular a spring plate for a level adjustment device, in particular a vehicle height adjustment device, comprising a spring retaining ring with an internal cross section, in particular an internal cross-sectional area, characterized in that the spring seat has at least one spring element for reducing the internal cross section of the spring retaining ring.

Within the context of the present invention, a spring element is understood to be a device with which the internal cross section of the spring retaining ring on which it is arranged can be reduced. The example, a spring element is designed as a clamping clip, a spring tongue, an insert part or a combination thereof. In particular the spring element, as an independent component, for example, is formed as a clamping clip, a spring tongue, an insert part or a combination thereof and is arranged on the spring seat.

2. The spring seat according to embodiment 1, characterized in that the at least one spring element is arranged in such a way, in particular formed in such a way, that the reduction in the internal cross section is carried out in the radial direction.
3. The spring seat according to either embodiment 1 or 2, characterized in that the at least one spring element is formed in one piece with the spring retaining ring.
4. The spring seat according to embodiment 3, characterized in that the at least one spring element is formed by a material cutout extending in the circumferential direction of the spring retaining ring, in particular a material cutout in the spring retaining ring.

Within the context of the present invention, a material cutout is understood to be an area of the spring retaining ring which has no material. In particular a material cutout is formed as a material notch, for example as a clearance, a gap, a cut or a combination thereof in the spring retaining ring.

5. The spring seat according to one of embodiments 1 to 4, characterized in that the at least one spring element is designed to be open at one end on the side of the spring retaining ring that faces the internal cross section.
6. The spring seat according to one of embodiments 1 to 5, characterized in that the spring retaining ring has an internal thread.
7. The spring seat according to embodiment 6, characterized in that the internal thread of the spring retaining ring is partly non-continuous.

Within the context of the present invention, non-continuous is understood, for example, to mean that the internal thread is interrupted, in particular by a gap.

8. The spring seat according to one of embodiments 1 to 7, characterized in that the spring seat additionally has a spring element adjustment device, in particular a tensioning element for adjusting the spring tension of the at least one spring element, in particular for adjusting the reduction in the internal cross section of the spring retaining ring.

Within the context of the present invention, a spring element adjustment device is understood to be a device with which a spring element of a spring seat can be moved in the direction of the internal cross section in such a way that the internal cross section of the spring retaining ring of the spring seat can be reduced, in particular lowered. For example, a spring element adjustment device can be a tensioning element, in particular a clamping screw, a wedge, a roll pin or a combination thereof.

9. A spring seat according to one of embodiments 4 to 7, characterized in that the spring seat additionally has a spring element adjustment device, in particular a tensioning element, in particular for widening the material cutout extending in the circumferential direction of the spring retaining ring.
10. A method for producing a spring seat, in particular a spring plate for a vibration damper, in particular a vehicle vibration damper, according to one of the preceding embodiments 1 to 9, comprising the steps:
    a) Providing a spring seat, in particular a spring plate for a vibration damper, in particular a vehicle vibration damper, according to one of the preceding embodiments 1 to 9, comprising a spring retaining ring with an internal cross section, in particular an internal cross-sectional area, and
    b) forming at least one spring element on the spring seat provided in step a) in such a way that an adjustment of the reduction in the internal cross section of the spring retaining ring is carried out by using the spring element.
11. The method for producing a spring seat according to embodiment 10, characterized in that the reduction in the internal cross section by the at least one spring element is carried out in the radial direction.
12. The method for producing a spring seat according to one of embodiments 10 to 11, characterized in that the formation of the at least one spring element in step b) is carried out in one piece, in particular a method selected from a group of a material removal process, an additive fabrication process or a combination thereof.
13. The method for producing a spring seat according to one of embodiments 10 to 12, characterized in that the formation of the spring element in step b) is carried out by producing a material cutout extending in the circumferential direction of the spring retaining ring, in particular a material notch in the spring retaining ring.

14. The method for producing a spring seat according to one of embodiments 10 to 13, characterized in that the formation of the spring element in step b) is carried out in such a way that the at least one spring element is designed to be open at one end on the side of the spring retaining ring that faces the internal cross section.

15. The method for producing a spring seat according to one of embodiments 10 to 14, characterized in that the provision of the spring seat provided in step a) is carried out with a spring retaining ring comprising an internal thread.

16. The method for producing a spring seat according to embodiment 15, characterized in that the provision of the spring seat provided in step a) is carried out with a spring retaining ring comprising an internal thread with a partly non-continuous internal thread.

17. The method for producing a spring seat according to one of embodiments 10 to 16, characterized in that in a further step c), in addition a spring element adjustment device, in particular a tensioning element, is provided, wherein an adjustment of the spring tension of the at least one spring element, in particular an adjustment of the reduction in the internal cross section of the spring retaining ring is carried out with the spring element adjustment device.

18. The method for producing a spring seat according to one of embodiments 13 to 16, characterized in that in a further step c), in addition a spring element adjustment device, in particular a tensioning element, is provided, wherein an adjustment of the spring tension of the at least one spring element, in particular a widening of the material cutout extending in the circumferential direction of the spring retaining ring, is carried out with the spring element adjustment device.

19. A vibration damper for vehicles, comprising
a damper tube at least partly filled with damping fluid, wherein a spring seat, in particular a spring plate, is arranged coaxially around the damper tube, wherein a piston rod can be moved to and fro in the damper tube, wherein an operating piston can be moved together with the piston rod, by means of which the internal space of the damper tube is divided into an operating chamber on the piston rod side and an operating chamber remote from the piston rod, characterized in that the spring seat has at least one spring element, wherein the spring seat forms a force-fitting connection, in particular a clamping connection, with the damper tube by means of the at least one spring element.

20. The vibration damper according to embodiment 19, characterized in that the force-fitting connection is additionally a form-fitting connection.

21. The vibration damper according to one of embodiments 19 to 20, characterized in that the at least one spring element is formed in one piece with the spring retaining ring.

22. The vibration damper according to one of embodiments 19 to 21, characterized in that the at least one spring element is formed by a material cutout extending in the circumferential direction of the spring retaining ring, in particular a material notch in the spring retaining ring.

23. The vibration damper according to one of embodiments 19 to 20, characterized in that the at least one spring element is open at one end on the side of the spring retaining ring that faces the internal cross section.

24. The vibration damper according to one of embodiments 19 to 20, characterized in that the spring retaining ring has an internal thread.

25. The vibration damper according to embodiment 24, characterized in that the internal thread of the spring retaining ring is partly non-continuous.

26. The vibration damper according to one of embodiments 19 to 21, characterized in that the spring seat additionally has a spring element adjustment device, in particular a tensioning element for adjusting the spring tension of the at least one spring element, in particular for adjusting the reduction in the internal cross section of the spring retaining ring.

27. The vibration damper according to one of embodiments 22 to 26, characterized in that the spring seat additionally has a spring element adjustment device, in particular a tensioning element, in particular for widening the material cutout extending in the circumferential direction of the spring retaining ring.

28. A level adjustment device, in particular a lifting element for level adjustment, in particular vehicle height adjustment, wherein the level adjustment device has a spring seat, in particular a spring plate comprising a spring retaining ring with an internal cross section, in particular an internal cross-sectional area, characterized in that the spring seat has at least one spring element for reducing the internal cross section of the spring retaining ring.

For example, a level adjustment device within the context of the present invention can be selected from a group comprising a sleeve, in particular a threaded sleeve, a bush, in particular a threaded bush, a lifting device, in particular a hydraulic lifting device, a pneumatic lifting device, a mechanical lifting device, an electrical lifting device, a lifting element, an adjustment spindle, in particular a spindle drive or a combination thereof.

29. The level adjustment device according to embodiment 28, characterized in that the at least one spring element is arranged, in particular formed, in such a way that the reduction in the internal cross section is carried out in the radial direction.

30. The level adjustment device according to one of embodiments 28 to 29, characterized in that the at least one spring element is formed in one piece with the spring retaining ring.

31. The level adjustment device according to one of embodiments 28 to 30, characterized in that the at least one spring element is formed by a material cutout extending in the circumferential direction of the spring retaining ring, in particular a material notch in the spring retaining ring.

32. The level adjustment device according to one of embodiments 28 to 31, characterized in that the at least one spring element is open at one end on the side of the spring retaining ring that faces the internal cross section.

33. The level adjustment device according to one of embodiments 28 to 32, characterized in that the spring retaining ring has an internal thread.

34. The level adjustment device according to embodiment 33, characterized in that the internal thread of the spring retaining ring is partly non-continuous.

35. The level adjustment device according to one of embodiments 28 to 30, characterized in that the spring seat additionally has a spring element adjustment device, in particular a tensioning element for adjusting the spring tension of the at least one spring element, in particular for adjusting the reduction in the internal cross section of the spring retaining ring.

36. The level adjustment device according to one of embodiments 31 to 34, characterized in that the spring seat additionally has a spring element adjustment device, in particular a tensioning element, in particular for widening the material cutout extending in the circumferential direction of the spring retaining ring.

37. Use of a spring seat, in particular a spring plate according to one of the preceding embodiments 1 to 9 for producing a vibration damper, in particular a vehicle vibration damper according to one of the preceding embodiments 19 to 27 and/or for producing a level adjustment device, in particular a lifting element for level adjustment, in particular vehicle height adjustment according to one of the preceding embodiments 28 to 36.

Illustrated in FIG. 1 is a vibration damper 2 having a damper tube 8, a piston rod 9 that can be moved to and fro and a spring seat 1 arranged coaxially around the damper tube 8 and having a spring retaining ring 4 according to the prior art. The spring seat 1 is in particular secured against rotation with a locking ring 13.

An operating piston 10 arranged on the piston rod 9 can be moved along together with the piston rod 9, wherein the internal space of the damper tube 8 is divided by the operating piston 10 into an operating chamber 11 on the piston rod side and an operating chamber 12 remote from the piston rod.

Figure 2:
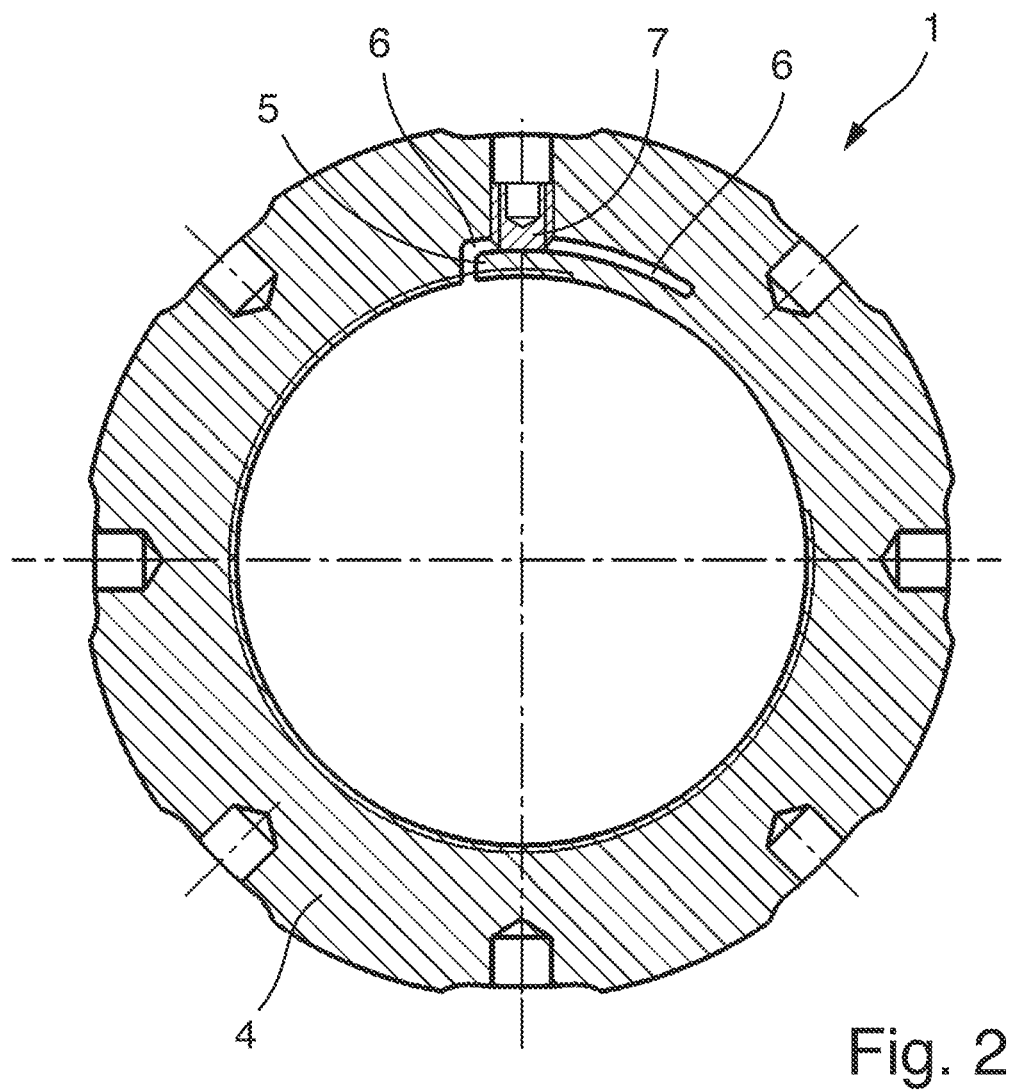
FIG. 2 is a schematic, cross-sectional view of an example spring seat.

Illustrated in FIG. 2 is an embodiment of the spring seat 1 according to the invention having a spring retaining ring 4 with an internal cross section, in particular internal cross-sectional area, and a spring element 5. The spring element 5, illustrated by way of example as a clamping clip, in particular a spring tongue with an end open on one side, is formed by a material cutout 6 extending in the circumferential direction of the spring retaining ring 4. In the area of the open end of the spring element 5, on the side of the spring retaining ring 4 that faces away from the internal cross section, is an opening, in particular a drilled hole, which opens from the outer lateral surface of the spring retaining ring 4 as far as the material cutout 6. By using a spring element adjustment device 7, in particular a grub screw, the spring element 5, in particular the end of the clamping clip that is opposite the opening, can be displaced in the direction of the internal cross section and therefore the internal cross section of the spring retaining ring 4 can be reduced.

Figure 3:
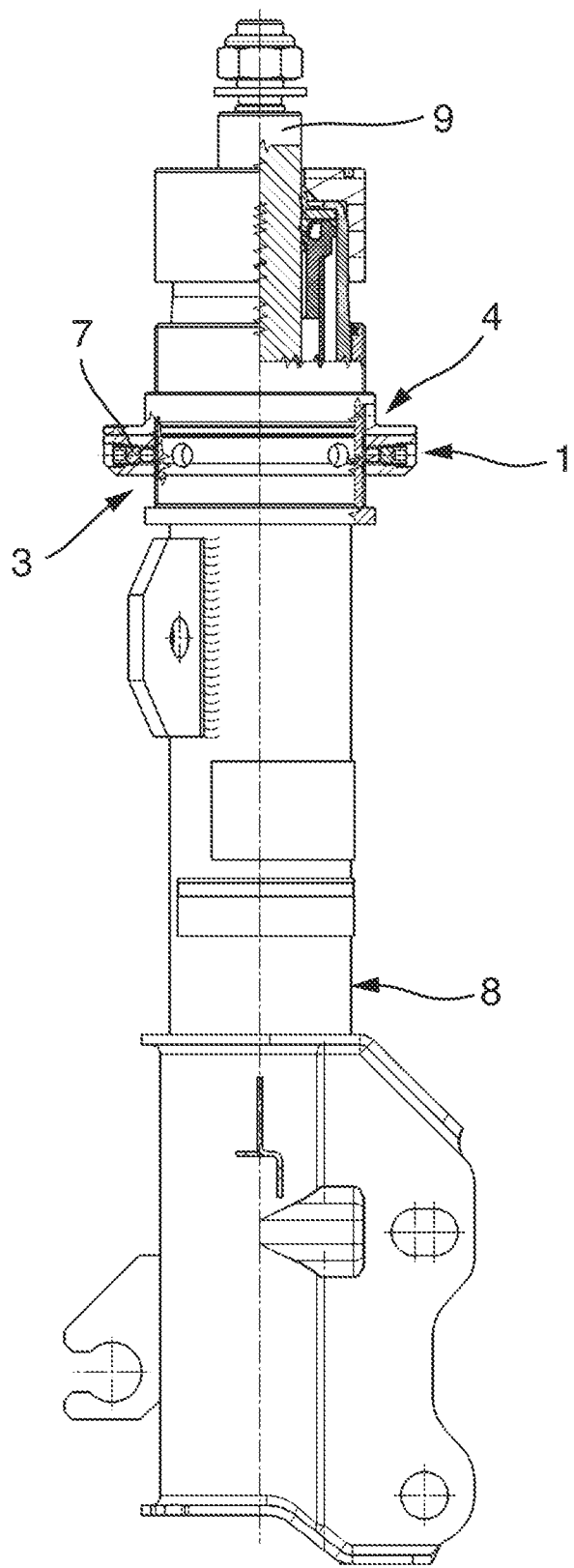
FIG. 3 is a schematic, partial cutaway view of an example vibration damper.

Illustrated in FIG. 3 is an embodiment of the vibration damper 2 according to the invention having a spring seat 1 according to the invention and illustrated according to FIG. 2 arranged on the vibration damper 2.

Figure 4:
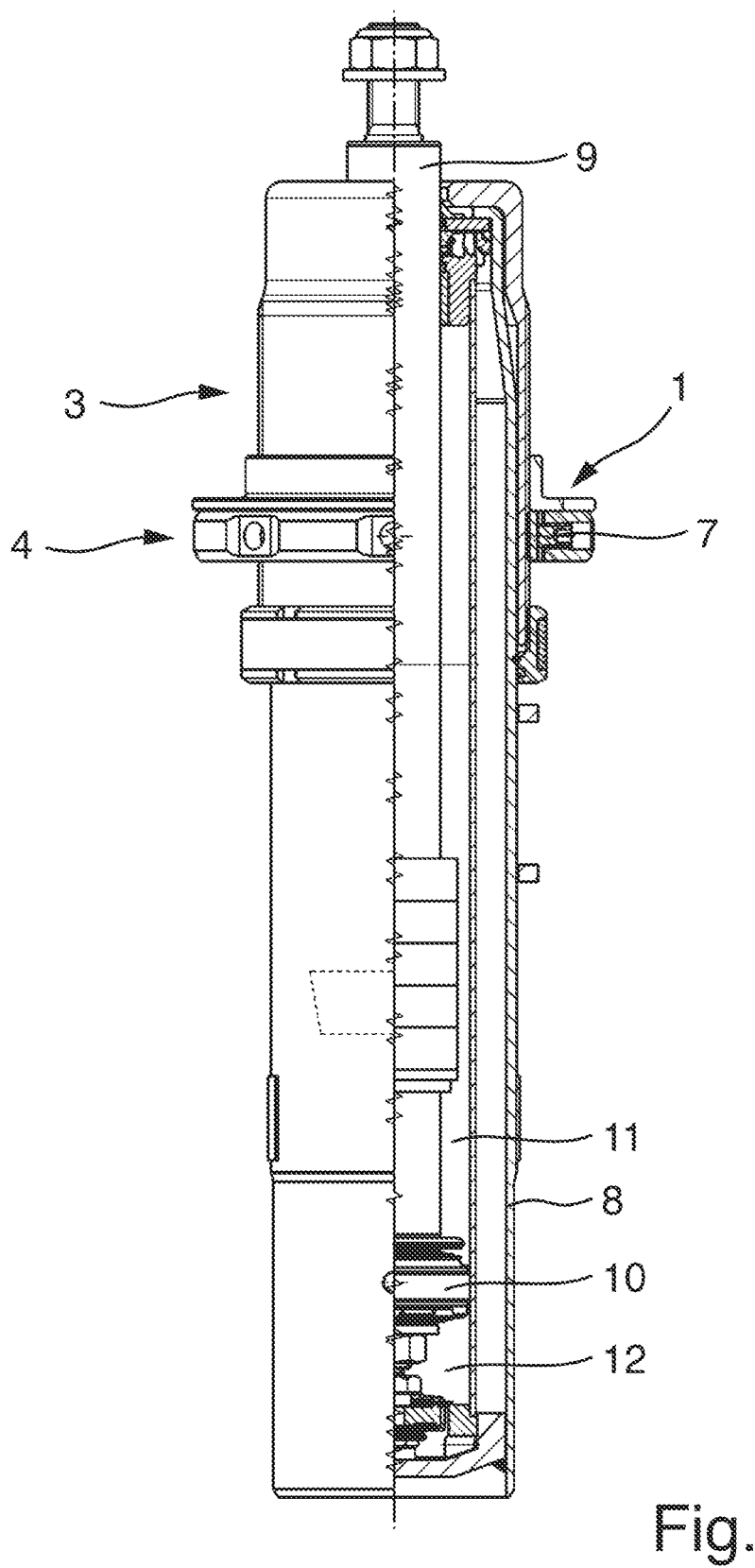
FIG. 4 is a schematic, cutaway view of an example level adjustment device.

Illustrated in FIG. 4 is an embodiment of a level adjustment device 3 according to the invention having a spring seat 1 according to the invention with spring retaining ring 4 according to FIG. 2.

COMMERCIAL APPLICABILITY

Spring seat, method for producing a spring seat, vibration damper and level adjustment devices of the above-described type are used in the production of vibration dampers and also level adjustments, in particular height adjustment.

LIST OF DESIGNATIONS

1 Spring seat
2 Vibration damper
3 Level adjustment device
4 Spring retaining ring
5 Spring element
6 Material cutout
7 Spring element adjustment device
8 Damper tube
9 Piston rod
10 Operating piston
11 Operating chamber on the piston rod side
12 Operating chamber remote from the piston rod
13 Locking ring

What is claimed is:

1. A spring seat for a vibration damper or a vehicle height adjustment device, comprising:
   a spring retaining ring with an internal cross section; and
   a spring element configured to reduce the internal cross section of the spring retaining ring,
   wherein the spring element is integral with the spring retaining ring such that the spring element and the spring retaining ring are a one-piece construction;
   wherein the spring element is formed by a material cutout extending in a circumferential direction of the spring retaining ring;
   wherein the spring seat further comprises a spring element adjustment device that is configured to widen the material cutout.

2. The spring seat of claim 1 wherein the spring element is configured such that a reduction of the internal cross section is configured to occur in a radial direction.

3. The spring seat of claim 1 comprising a tensioning element configured to adjust a spring tension of the spring element.

4. The spring seat of claim 1 wherein the spring element adjustment device is configured to adjust a reduction in the internal cross section of the spring retaining ring.

5. The spring seat of claim 1, wherein the spring element is configured as a material notch extending in a circumferential direction of the spring retaining ring.

6. A method for producing a spring seat, the method comprising:
   providing the spring seat of claim 1; and
   forming the spring element on the spring seat such that an adjustment of a reduction in the internal cross section of the spring retaining ring is performed by using the spring element.

7. A vibration damper for a vehicle, comprising:
   a damper tube that is at least partly filled with damping fluid;
   a spring seat disposed coaxially around the damper tube, wherein the spring seat includes a spring retaining ring with an internal cross section and a spring element configured to reduce the internal cross section of the spring retaining ring,
   wherein the spring seat forms a force-fitting connection with the damper tube by way of the spring element;
   wherein the spring element is integral with the spring retaining ring such that the spring element and the spring retaining ring are a one-piece construction;

wherein the spring element is formed by a material cutout extending in a circumferential direction of the spring retaining ring;

wherein the spring seat further includes a spring element adjustment device that is configured to widen the material cutout;

a piston rod that is movable to and fro in the damper tube; and an operating piston that is movable together with the piston rod, with the operating piston dividing an internal space of the damper tube into an operating chamber on a piston rod side and an operating chamber remote from the piston rod.

8. The vibration damper of claim 7 wherein the spring seat is a spring plate.

9. A level adjustment device comprising a spring seat that includes:

a spring retaining ring with an internal cross section; and a spring element configured to reduce the internal cross section of the spring retaining ring, wherein the spring element is integral with the spring retaining ring such that the spring element and the spring retaining ring are a one-piece construction;

wherein the spring element is formed by a material cutout extending in a circumferential direction of the spring retaining ring;

wherein the spring seat further includes a spring element adjustment device that is configured to widen the material cutout.

10. The level adjustment device of claim 9 configured as a lifting element for vehicle height adjustment.

11. The level adjustment device of claim 9 wherein the spring seat is a spring plate.

* * * * *